Sept. 29, 1959 A. E. BACHELET ET AL 2,906,996
ELECTRONIC STATION SELECTING CIRCUIT
Filed May 18, 1953 3 Sheets-Sheet 1

INVENTORS
A.E. BACHELET
F.S. ENTZ
BY J W Schmied
ATTORNEY

Sept. 29, 1959 A. E. BACHELET ET AL 2,906,996

ELECTRONIC STATION SELECTING CIRCUIT

Filed May 18, 1953 3 Sheets-Sheet 2

INVENTORS
A. E. BACHELET
F. S. ENTZ
BY J. W. Schmied
ATTORNEY

ELECTRONIC STATION SELECTING CIRCUIT

Filed May 18, 1953 3 Sheets-Sheet 3

INVENTORS
A.E. BACHELET
F.S. ENTZ
BY
J W Schmied
ATTORNEY

United States Patent Office 2,906,996
Patented Sept. 29, 1959

2,906,996

ELECTRONIC STATION SELECTING CIRCUIT

Albert E. Bachelet, New York, and Ferdinand S. Entz, Mount Kisco, N.Y., assignors to Bell Telephone Laboratories, Incorporated, New York, N.Y., a corporation of New York Application May 18, 1953, Serial No. 355,584

15 Claims. (Cl. 340—147)

This invention relates to selective signaling systems and more particularly to electrical impulse signaling systems for telephone or telegraph station calling.

In present day signaling systems such as may be used with automatic telephone or telegraph systems, continuous improvement is being sought to increase the speed of response and reliability of circuits used for detecting and counting signals.

It is an object of the present invention to provide for improved selective circuits responsive to dial pulses or the like. In the illustrated embodiment of the present invention, a communication system is provided having a plurality of terminating or receiving stations, each of which is designated by a code consisting of a series of letters, digits or combinations thereof. The signals are rceived at each of the receiving stations but only the selected one thereof provides an indication, either visual or audible or both, to alert the called party. It is necessary that the apparatus of each receiving station be adapted to ascertain not only the occurrence of a series of pulses but the order or time sequence thereof.

It is therefore another object of the present invention to provide an improved telephone calling system responsive to code groups of electrical impulses generated in sequence by such conventional means as a standard telephone dial.

Still another object of the present invention is to provide a novel impulse selective signaling system which is responsive to only one particular sequence of impulse code groups and which will automatically be restored to normal upon reception of any group not next in sequence of the particular assigned group.

The present invention accomplishes these objects by providing for a selective circuit having a cold cathode stepping tube of the general type described in Patent No. 2,575,370, granted November 20, 1951, to M. A. Townsend. Such a stepping tube may have ten cathodes so that the occurrence of two digits, such as 2 and 3, may be indicated by the stopping of the discharge at the second and third cathodes respectively. The stepping tube counts the dial pulses and activates an electronic digit register causing it to take one step for each digit received. When the proper number of pulses in the proper sequence are dialed, the digit register is stepped to its final position to provide an indication of the selection. A delay circuit is interposed between the cathodes of the stepping tube and the register or sequence circuit to assure the operation of the register only when the discharge in the stepping tube remains for a substantial time upon a particular cathode; in the case of the number 23, the second or third cathode. The operation of the stepping tube and the register is controlled by a detecting and timing circuit which operates responsive to the incoming pulses to the receiving station. The timing circuit maintains the digit register ready for operation during dialing, resets the cold cathode tube, and reduces the possibility of false operation due to transients and other disturbances.

A feature of the present invention relates to the provision of a selectively responsive receiving station having a timing circuit, digit register and stepping tube where the timing circuit maintains the digit counter ready for operation during dialing, resets the cold cathode tube, and reduces the possibility of false operation due to transients and other disturbances.

Another feature of the present invention pertains to the provision of a capacitor timing circuit which controls the operation and resetting of the various components in a selectively responsive receiving station.

Further objects, features and advantages will become apparent upon reference to the following description taken in conjunction with the drawings wherein.

Figure 1:
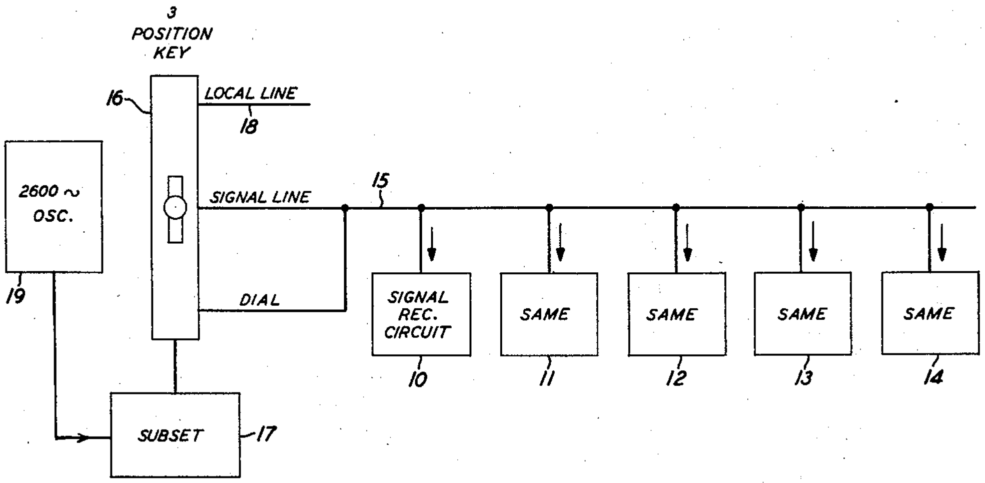
Fig. 1 is a representation of the calling system of the present invention.
Figure 2:
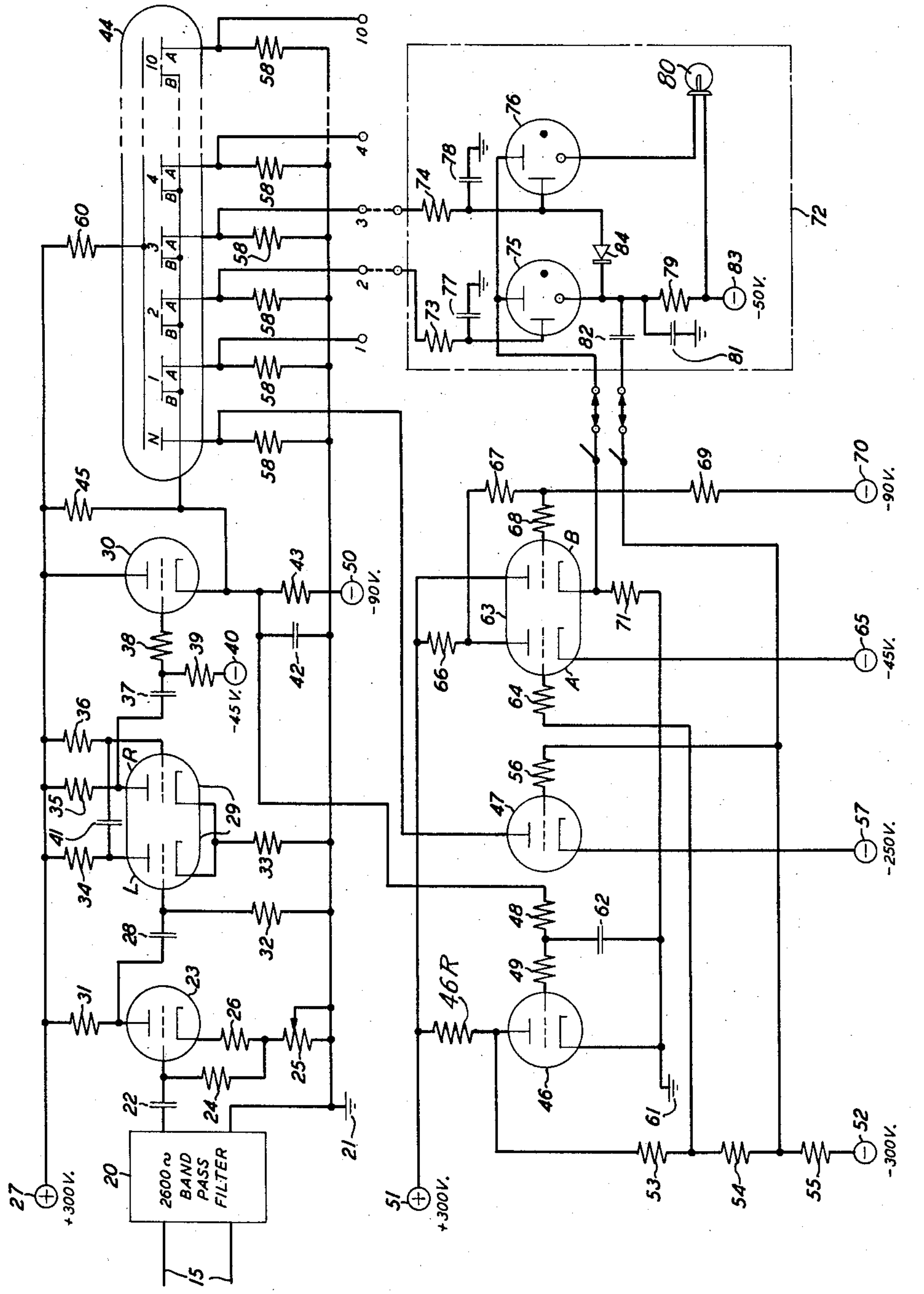
Fig. 2 is a circuit representation of the signal receiving station of the present invention.

Referring to Fig. 1, a number of signal receiving circuits 10, 11, 12, 13, 14, etc. are shown connected to a common signal line 15. The circuits 10, 11, 12, 13, 14, etc. are each part of outlying stations, not shown, which are connected to a common transmission line, also not shown, but which line 15 is a part thereof. The transmission line terminates in a three-position key 16 which is located at the control center. When the key 16 is at its uppermost position, it connects the control center subset 17 to the local line 18 for local transmission. When it is required to signal one of the outlying stations 10, 11, 12, 13, 14, etc., the key 16 is operated to the lowest or the dial position connecting the 2600-cycle source or oscillator 19 to the signal line 15' through the dial contacts, not shown, in the subset 17. The 2600-cycle signal is in this manner applied to each of the circuits 10, 11, 12, 13, 14, etc. The particular station which is to be called is dialed at the subset 17 in the usual manner modulating the 2600-cycle tone in accordance with the number dialed. In the specific embodiment described herein, the number dialed is a two-digit number so that the maximum number of stations upon the transmission line is 90. Any number of digits, however, may be utilized. For example, the use of a three-digit code allows 720 possible stations. The stations 10, 11, 12, 13, 14, etc. need not be connected to the same line 15 as there may be a plurality of lines 15 which are simultaneously pulsed from the subset 17. After one of the stations represented by circuits 10 through 14, etc. has been dialed or selected, as is hereinafter described, the switch 16 is positioned at its central terminal to connect the transmitting and receiving equipment of the subset 17 to the transmission line. One of the signal receiving circuits 10 through 14, etc., for example circuit 11, is shown in Fig. 2 which, as is also hereinafter described, is selected when the number 23 is dialed at the subset 17.

Figure 4:
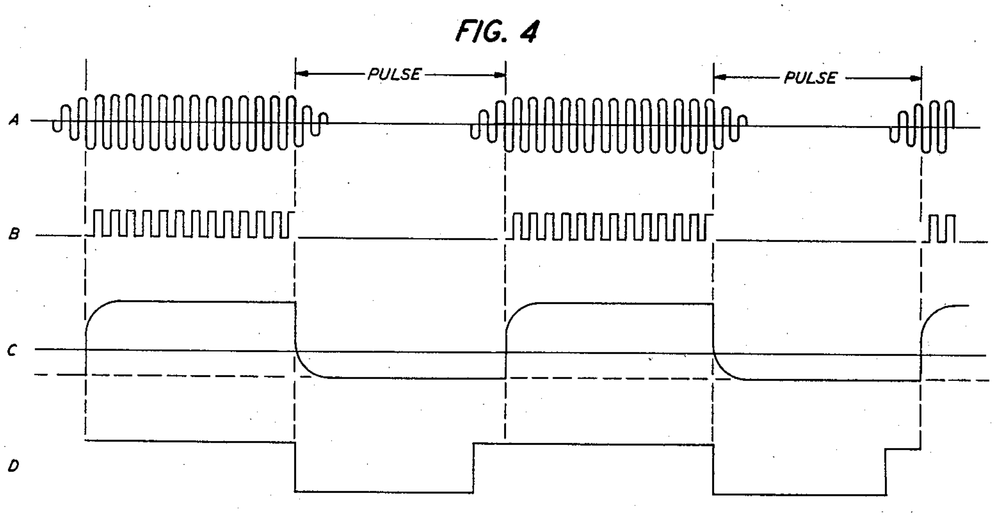
Fig. 4 is a series of voltage versus time curves illustrating the operation of the various circuit components in Fig. 2.

A call is originated at subset 17 when the dial key 16 is operated applying 2600-cycle tone from oscillator 19 to line 15. The 2600-cycle tone is received and selected by the 2600-cycle band-pass filter 20 which is connected to line 15. The output voltage from the filter 20 is shown in Fig. 4A. The build-up of the signal at the left of the curve is due to the delay characteristics of filter 20 as well as of line 15. The filter 20 is connected to ground 21 and is coupled through the .01 microfarad coupling capacitor 22 to the amplifying triode 23. The grid of triode 23 is connected to ground 21 through the 1 megohm grid-leak resistor 24 and the 51,000-ohm potentiometer 25 and to the cathode through the resistor 24 and 1000-ohm biasing resistor 26. The plate of triode 23 is connected to the +300 volt source 27 through the 51,000-ohm plate resistor 31 and through the .01 microfarad coupling capacitor 28 to the grid of triode L of the monostable double triode multivibrator tube 29. The amplified 2600-cycle carrier frequency from triode 23 is in this manner impressed upon the multivibrator tube 29. The signal from the amplifier triode 23 is substantially the same as shown in Fig. 4A but of larger magnitude. The purpose of the multivibrator double triode 29 is to produce an output signal that is substantially independent of variations in the input signal. The multivibrator tube 29 operates when the incoming sine wave becomes positive and after an interval of time, as is hereinafter described, which depends upon various associated time constants, restores to its original state. During this fixed interval, the double triode 29 provides an output pulse of constant magnitude to a detector triode 30.

The grid of triode L of tube 29 is connected to ground 21 through the 1 megohm grid-leak resistor 32, the cathodes of triodes L and R are connected to ground 21 through the 2000-ohm biasing resistor 33 and the plates of triodes L and R are connected respectively through the 25,000-ohm plate resistors 34 and 35 to the +300 volt source 27. The grid of triode R is connected to source 27 through the 620,000-ohm resistor 36 and the plate is connected to the grid of triode 30 through the .001 microfarad coupling capacitor 37 and 1 megohm resistor 38. The junction between capacitor 37 and resistor 38 is connected through the .5 megohm resistor 39 to the −45 volt source 40. The resistor 38 described, above, limits the grid current when the triode 30 conducts. As is hereinafter described, the timing of the multivibrator stage consisting of tube 29 and the associated circuit elements described above is essentially a function of the resistor 36 and a .005 microfarad capacitor 41 connected thereto and to the plate of triode L.

Before the 2600-cycle carrier frequency from the amplifier stage comprising triode 23 is coupled to the grid of triode L, triode R of tube 29 conducts since the grid thereof is positively biased by its connection to source 27 through resistor 36. The output voltage upon the plate of triode R of the multivibrator tube 29 is relatively low due to the drop in potential across resistor 35 when the triode R conducts. The relatively low potential upon the grid of tube 30 allows conduction and the potential upon its cathode is −24 volts as determined by the voltage divider action of the 10,000-ohm resistor 43 and the 100,000-ohm resistor 45 in parallel with the cathode-plate circuit of tube 30 which are connected between the −90 volt source 50 and the +300 volt source 27.

When the 2600-cycle signal is coupled from tube 23, the triode sections L and R of tube 29 alternatively conduct. A positive pulse upon the grid of triode L causes it to conduct as the pulse reaches a fixed positive value. Since the cathodes are at a positive potential due to the conduction through triode R, the potential upon the grid of triode L must reach a fixed positive value before triode L triggers. When the triode section L conducts, the potential upon its plate reduces causing the control grid of triode R to block the current through the triode section R. The cessation of current through the triode section R causes the potential upon its plate to raise to essentially the +300 volts from source 27. The triode section R remains non-conductive and the output voltage remains at this magnitude until the potential upon its grid is allowed to rise. The interval of time that the potential upon the grid of triode R is relatively negative is determined by the capacitor 41 and resistor 36. As the incoming signal to tube 29 starts to fall from the positive peak, the grid of triode R remains in its negative condition until the capacitor 41 discharges so that a square wave of constant magnitude and width is supplied to the detector stage comprising the tube 30. The width or interval of the square pulse is determined by the capacitor 41 and resistor 36, described above. The magnitude and pulse width is therefore substantially independent of variations in input signals. The square wave output from the tube 29 which is shown in Fig. 4B commences after the incoming signal shown in Fig. 4A builds up to a potential greater than the triggering potential required by the triode section L.

The square wave is applied to the grid of triode 30 and further overcomes the negative potential from source 40 to cause the detector tube 30 to conduct to a greater extent. The plate of tube 30 is connected to source 27 and the cathode thereof is connected to ground 21 through the 2-microfarad capacitor 42 and to source 50 through the 10,000-ohm resistor 43. The cathode of tube 30 is also connected to the "B" cathodes of the cold cathode stepping tube 44, to source 27 through the 100,000-ohm resistor 45 and to the grid of tube 46 through the 1 megohm resistors 48 and 49. The cold cathode stepping tube is of the general type disclosed in Patent 2,575,370, granted November 20, 1951, to M. A. Townsend and has a normalizing or "N" cathode, ten "A" cathodes and ten "B" cathodes. The "B" cathodes, as described above, are connected to the cathode of tube 30 which is at −24 volts until the 2600-cycle tone is received.

The greater conduction of tube 30 causes the potential upon its cathode to rise from −24 volts to +52 volts to charge capacitor 42. The discharging time of capacitor 42 is greater than the interval between pulses so that the cathode of tube 30 remains as shown in Fig. 4C at +52 volts as long as the 2600-cycle tone is being received.

Before the 2600-cycle tone was applied to the common signal line and tube 30 was still conducting in the lesser amount as described above, the −24 volt on its cathode is applied to the grid of the amplifier triode 46 preventing conduction through the triode 46. The plate of triode 46 is connected to the +300 volt supply 51 through the resistor 46R and to the −300 volt supply 52 through the serially connected resistors 53, 54 and 55 which together form a voltage divider. When the tube 46 does not conduct, the potential at the junction between resistors 53 and 54 is at −38 volts and the potential at the junction between resistors 54 and 55 is at −240 volts. The latter junction is connected through the 1 megohm grid resistor 56 to the grid of the inverter triode 47. The cathode of triode 47 is connected to the −250 volt source 57 and the plate thereof is connected to the "N" cathode of the cold cathode stepping tube 44, described above. The "N" and the ten "A" cathodes are connected respectively through the 20,000-ohm resistors 58 to ground 21. The −240 volts upon the grid of triode 47 cause triode 47 to conduct due to the −250 volts upon its cathode from source 57. The conduction of triode 47 maintains the potential upon the "N" cathode of tube 44 at −120 volts which maintains the stepping tube 44 locked-in. The tube 44 is ionized with the current path being from source 27 through a 75,000-ohm plate resistor 60, the plate or anode of tube 44, the "N" cathode and its associated resistor 58 to ground 21. The potential upon the "A" cathodes is at ground potential due to their connections to ground 21. In this manner the stepping tube 44 is normalized before the modulated 2600-cycle tone is applied to the line 15 and the signal receiving circuit 11. As long as capacitor 42 remains at −24 volts or when the 2600-cycle tone is not applied to line 15, triode 47 conducts passing 4 milliamperes and applies a relatively high negative potential to the "N" cathode. The application of the high negative potential to the "N" cathode prevents false operation or stepping in the stepping tube 44 due to unwarranted frequencies or transients. Even if a transient would cause the potential upon capacitor 42 to change to +52 volts, the stepping tube 44 would still not falsely operate due to a delay, as is hereinafter described, in the operation of the amplifier triode 46. The grid of triode 46 is connected to its cathode and ground 61 through the resistor 49 and a 1 microfarad capacitor 62. The capacitor 62 provides for a one-second delay in the operation of the triode amplifier which includes triode 46 after the increase of potential upon the cathode of triode 30. The delay provides for security against false operation of the stepping tube 44 by maintaining the −120 volts upon the "N" cathode. The capacitance of capacitor 62 is not necessarily restricted to 1 microfarad but may be varied depending upon the security desired. The delay in effect maintains the stepping tube 44 locked until the 2600-cycle tone has been applied for a sufficient interval to cause the potential upon the grid of triode 46 to increase and trigger the conduction.

When the 2600-cycle tone is applied for approximately more than one second, the triode 46 conducts and causes the potentials at the junctions between the resistors 53, 54 and 55 to change. The potential at the junction between resistors 54 and 55 changes from −240 volts to −265 volts and, due to its connection to the grid of triode 47, cuts off conduction therethrough. The cessation of conduction through triode 47 causes the potential upon the "N" cathode of tube 44 to increase from −120 volts to +40 volts and "unlock" the tube 44. Once the discharge is initiated in tube 44, it sustains even when the potential upon the "N" cathode increases to +40 volts. The ionization current of 2 milliamperes through the resistance 58 associated with the "N" cathode maintains the +40 volts on the "N" cathode.

When the potential upon the cathode of triode 30 described above increases to +52 volts responsive to the 2600-cycle tone, the potential upon the "B" cathodes of the stepping tube 44 increased in a similar manner due to their direct connection thereto. The positive potential upon the "B" cathodes prevents the transfer of ionization thereto from the "N" cathode after its potential increases to the sustaining +40 volt potential. The positive potential upon the "B" cathodes together with the high negative potential upon the "N" cathode also prevent false operation or stepping due to transients or other disturbances.

The junction between resistors 53 and 54 is connected to the grid of triode or section A of the double triode 63 through the 1 megohm grid current limiting resistor 64. The cathode of triode A is connected to the −45 volt source 65 and the anode thereof is connected to source 51, described above, through the 35,000-ohm plate resistor 66. The plate of triode A is also connected to the grid of triode B of tube 63 through the 62,000-ohm resistor 67 and the 1 megohm current limiting resistor 68. The junction of resistors 67 and 68 is connected through the 100,000-ohm resistor 69 to the −90 volt source 70. The plate of triode B is connected to the source 51 and the cathode thereof is connected to ground 61 through the 100,000-ohm cathode resistor 71. Before the application of the 2600-cycle tone or carrier and with the potential upon the grid of triode A at −38 volts, triode A conducts and impresses a negative potential upon the grid of triode B due to the connection through resistor 67. Triode B of tube 63 is therefore not conductive before the application of the 2600-cycle carrier. When the potential at the junction of resistors 53 and 54 changes from −38 volts to −130 volts, as described above, triode A is cut off and triode B becomes conductive. The tube 63 is an inverter tube and supplies, as is hereinafter described, a main anode potential from the cathode of triode B to the digit counter 72, as hereinafter described.

Summarizing the condition of the various components in the signal receiving circuit 11 shown in Fig. 2 before the 2600-cycle signal is impressed, only the triodes R, 30, 47 and A are conductive. The stepping tube 44 is ionized with conduction being through the "N" cathode. After the application of the 2600-cycle carrier the triodes 23, L, 46 and B become conductive and the triodes R, 47 and A are cut off. The triodes L and R oscillate back and forth with each of the 2600-cycle pulses. Conduction through triode 30 increases and decreases with each of the 2600-cycle pulses and conduction through the stepping tube 44 decreases but remains at the "N" cathode. The circuit remains in this condition with the 2600-cycle tone applied until dialing is commenced.

When the dial, not shown, in subset 17, which is shown in Fig. 1, is operated, a series of pulses are provided that modulate the 2600-cycle tone. Fig. 4D illustrates the opening and closing of the contacts of the dial. When the dial opens the line 15 a pulse is provided to the signal receiving circuits 10 through 14, etc. The modulation of the 2600-cycle tone by the 10-cycle per second dial pulses is shown in Fig. 4A. The effects of the dial pulsing upon the output of the multivibrator tube 29 are shown in Fig. 4B and upon the potential at the cathode of tube 30 are shown in Fig. 4C.

During the 50 milliseconds of the dial pulse duration, the 2600-cycle tone is not applied to the filter 20 and triode 23. The multivibrator tube 29 stops alternatively conducting through the triodes L and R and conducts only through triode R. The conduction through triode R restricts the conduction through the detector triode 30 and allows the capacitor 42 to discharge and reduce the cathode potential from +52 volts to −24 volts. The drop in potential upon the cathode of triode 30 has no effect upon the amplifier circuit which includes the triode 46 as the time delay due to the capacitor 62 and resistor 48 is much greater than the 50-millisecond dial pulse. Triode 46 therefore continues to conduct and provides −130 volts to the grid of the triode section A and −265 volts to the grid of triode 47 and the digit register 72. The tubes 46, 47 and 63 maintain the same circuit condition during the pulsing of a digit as during the reception of the 2600-cycle carrier alone.

The change in potential on the capacitor 42 upon the reception of a dial pulse provides a corresponding change at the "B" cathodes of the stepping tube 44. As the potential upon the first "B" cathode, which is the "B" cathode adjacent the "N" cathode, is lowered to −24 volts, the discharge is seized thereby because of the greater potential difference between it and the anode. At the end of the dial pulse, the 2600-cycle tone is reapplied causing the multivibrator tube 29 to operate and supply positive pulses to the detector tube 30. The operation of the detector tube 30 recharges the capacitor 42 to +52 volts and thereby raising the potential upon the "B" cathodes to +52 volts. The "A" cathode is at substantially ground potential and the discharge transfers to the first "A" cathode. As more pulses are received the "B" cathodes alternately assume voltages of −24 volts and +52 volts. Each time an individual "B" cathode acquires a negative voltage it will seize the conduction from the preceding adjacent "A" cathode. The geometry of the stepping tube 44 and that of each of the electrodes "A" and "B" is such that a transfer can only be made to a subsequent cathode. This transfer is made when the "B" cathode acquires a positive voltage. As the "A" cathode is maintained at ground potential, the discharge is transferred thereto because of the greater potential difference existing between it and the anode. This process is repeated for each pulse and the "A" cathode to which the conduction is last transferred is indicative of the total count of the pulses contained in the signal.

When the discharge is transferred to an "A" cathode, its potential increases from ground potential to +40 volts. The duration of this potential change is comparatively of short duration compared to the duration of potential change of the last "A" cathode of a pulse count. For example, if the digit 2 is dialed, the potential upon the first "A" cathode changes to +40 volts for 50 milliseconds and the potential upon the second "A" cathode remains at +40 volts for approximately 500 milliseconds which is the interdigit time interval. The difference in the duration of potential change upon the "A" cathodes is utilized, as is hereinafter described, in the operation of the digit counter 72.

The digit register 72 is responsive to a potential change upon selected ones of the "A" cathodes for an interval of approximately 500 milliseconds. In the illustrative embodiment described herein, the digit register 72 is responsive to the dialing of the number 23. The second and third "A" cathodes are connected respectively through the 250,000-ohm resistors 73 and 74 to the starter electrodes of the gaseous tubes 75 and 76. The resistors 73 and 74 together with the 1 microfarad capacitors 77 and 78 which are connected from the starter anodes to ground form a delay network. The +40 volts upon the "A" cathodes of tube 44 are therefore applied to the starter anodes of tubes 75 and 76 through a delay network which discriminates between the passing 50-millisecond potential change and the duration of the interdigit potential change. The time constant of these delay circuits is 250 milliseconds which provides an adequate safety factor. The cathodes of tubes 75 and 76 are connected to a —50 volt source 83 through a 20,000-ohm resistor 79 and the output element or lamp 80, respectively. The cathode of tube 75 is also connected through a .01 microfarad shunting capacitor 81 to ground and through a .001 microfarad coupling capacitor 82 to the junction of the resistors 54 and 55, described above. The main anodes of the gaseous tubes 75 and 76 are connected to the cathode of triode section B of tube 63.

As described above, when a digit is being dialed, the tubes 46, 47 and 63 are not disturbed due to the delay by the capacitor 62. The potential at the junction of resistors 54 and 55 therefore is at —265 volts and the potential upon the cathode of triode section B is at +125 volts when the dial pulses are received. The main gaps of gaseous tubes 75 and 76 are therefore impressed with 175 volts; +125 volts at the main anodes and —50 volts at the cathodes. The 175 volts are insufficient to ionize the tubes 75 and 76. When, however, the potential of the starter anode of tube 75 is increased to +40 volts, ionization commences across the starting gap and is transferred to the main gap. The ionization of the gaseous tube 75 causes its cathode potential to change from —50 volts to +50 volts. The change in potential upon the cathode of tube 75 or the +100 volt pulse is transmitted through capacitor 82 to the grid of triode 47 causing it to momentarily conduct. The conduction of triode 47 reduces the potential upon the "N" cathode of the stepping tube 44 from ground to —120 volts causing it to seize the discharge from the second "A" cathode. Tube 44 is in this manner normalized and readied to count the next digit when the gaseous tube 75 ionizes. When the discharge in stepping tube 44 is removed from the second "A" cathode and thus from the starting anode of tube 75, tube 75 remains ionized across its main gap as the potentials applied thereacross are sufficient to sustain the ionization.

When the stepping tube 44 was normalized during the interdigit interval, the potential upon the capacitor 42 and the "B" cathodes of tube 44 as well was at +52 volts. The stepping tube 44 therefore remains normalized when the potential upon its "N" cathode once again increases to +40 volts.

The circuit of Fig. 2 is now ready for the reception of the second digit with the only change due to the reception of the first digit being the ionization of the gaseous tube 75.

When the digit 3 is dialed the stepping tube 44 advances the discharge to the third "A" cathode and applies a +40 volt potential to the starting gap of the gaseous tube 76 causing it to ionize. The ionization of tube 76 energizes the output device or lamp 80 described above.

The starting anode of tube 76 is connected through a varistor 84 to the cathode of tube 75. If the digit 3 were dialed before the digit 2, tube 76 would not ionize as the varistor 84 would be connected to a potential of —50 volts and present a low impedance to the voltage from the third "A" cathode of stepping tube 44. When the varistor impedance is low, the voltage across the control or starting gap of tube 76 is limited to a value below the required ionization or breakdown potential. When tube 75, however, is ionized and the varistor 84 is connected to a potential of +50 volts, varistor 84 presents a high impedance to the stepping tube voltage which is effective to ionize tube 76. The digit counter 72 is in this manner responsive to the number 23 and no other combination of two different digits. Dialing the number 32 does not provide an output indication by the lamp 80.

When the 2600-cycle tone is removed from line 15, the potential upon capacitor 42 reduces to —24 volts cutting off tube 46 after a delay due to capacitor 62. As triode 46 stops conducting, the potentials at the junctions between resistors 53, 54 and 55 increase to —38 volts and —240 volts. The change in potential at the junction of resistors 53 and 54 causes the triode 47 to conduct and once again normalizes the stepping tube 44 and the change in potential at the junction between resistors 54 and 55 causes triode section A of tube 63 to conduct. The conduction of triode section A cuts off conduction through triode section B and reduces its cathode potential below the sustaining potential for the gaseous tubes 75 and 76. The circuit is in this manner restored to normal with only the triodes R, 30, 47 and A conductive, and the tube 44 normalized.

The timing functions in the signal receiving circuit shown in Fig. 2 are performed by the capacitors 42, 62, 77 and 78. The capacitor 42 maintains the potential upon the cathode of triode 30 at +52 volts between the positive pulses from the multivibrator tube 29; the capacitor 62 discriminates between the dialing period and disconnect, provides for protection against interferences due to transients and other disturbances, and controls the normalizing of the stepping tube 44 at the completion of dialing as well as the application of main anode potential to the digit register 72; and the capacitors 77 and 78 discriminate between the duration of discharge upon the "A" cathodes during the pulsing of a digit and during the interdigit interval.

If the 2600-cycle tone is removed immediately after the pulsing of the last digit but before the ionization of tube 76, the delay due to capacitor 62 maintains the circuitry in condition to count the last digit.

Figure 5:
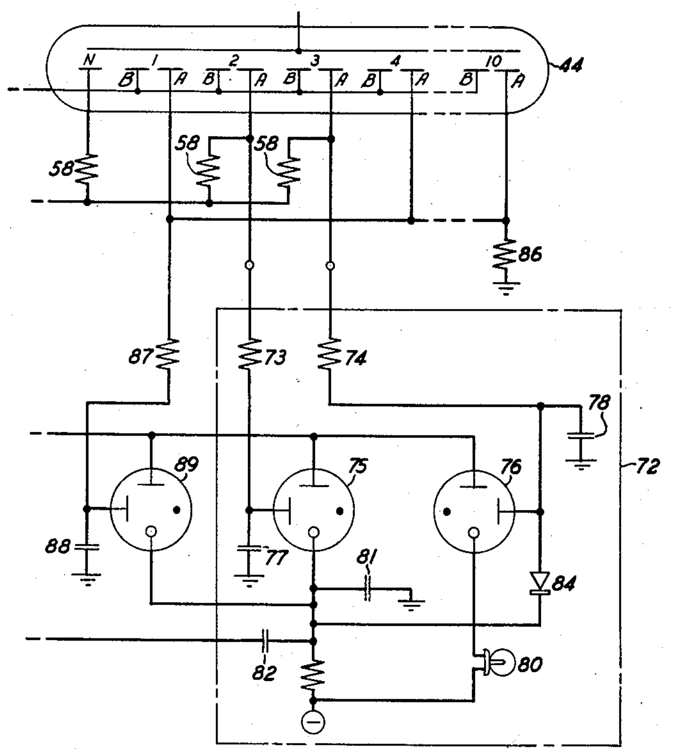
Fig. 5 is a circuit representation of another modification of the digit counter of the signal receiving station of the present invention.

As a further protection against false operation a guard circuit as shown in Fig. 5 may be utilized. As only two of the "A" cathodes are utilized in counting the two-digit code all the unused positions can be combined in one resistive circuit hereinafter described. In Fig. 5 the circuit components that are the same as shown in Fig. 2 are designated by the same numerals. The cathodes "A" which are not utilized in the digit counting are connected to ground through resistor 86 and to the starting anode of the gaseous tube 89 through resistor 87. The starting anode of tube 89 is also connected to ground through capacitor 88. The main anode of tube 89 is connected to the main anodes of tubes 75 and 76 and the cathode thereof is connected to the cathode of tube 75. The tube 89 is, in effect, a lock-out tube for preventing the ionization of tube 75 when the discharge in tube 44 comes to rest upon an unselected "A" anode. Whenever the discharge in tube 44 comes to rest upon any of the unwanted "A" cathodes, the gas tube 89 ionizes after a delay determined by capacitor 88 and increases the potential upon its cathode and the cathode of tube 75 to +50 volts. As long as tube 89 remains ionized, tube 75 is locked out and cannot be ionized. It is necessary to recycle the signal receiving circuit and extinguish tube 89 before the digit counter 72 can become effective again.

Figure 3:
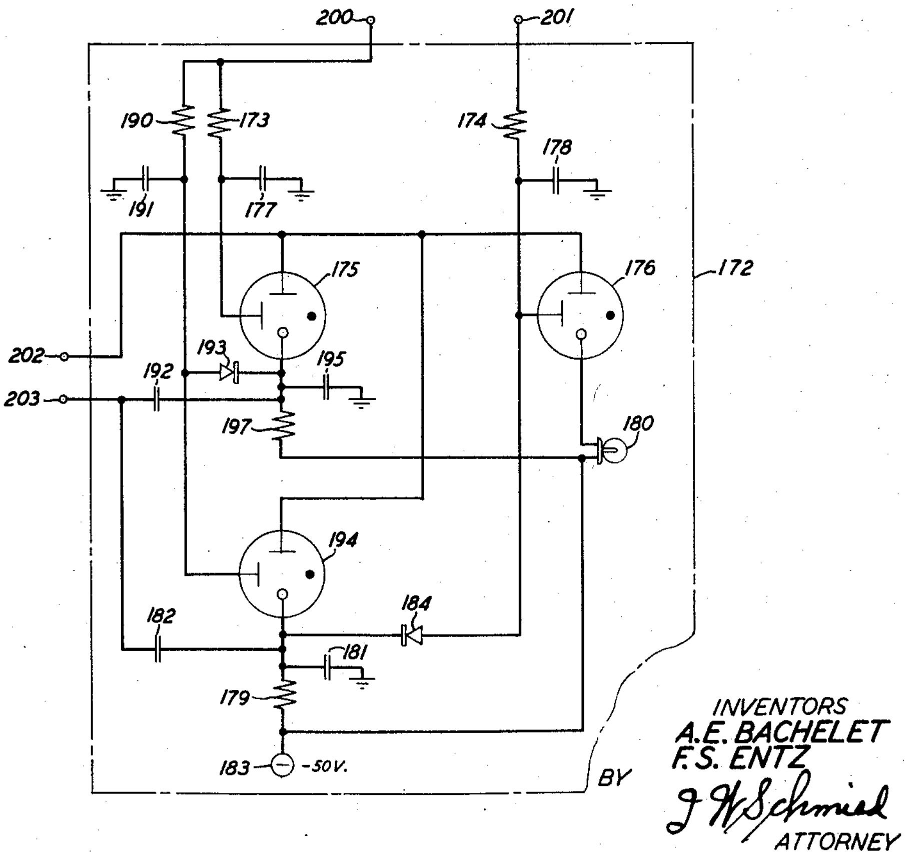
Fig. 3 is a circuit representation of a modification of the digit counter of the signal receiving station of the present invention.

The specific embodiments shown in Figs. 2 and 5 are modifications that provide for the reception and detection of a two-digit code. The modification shown in Fig. 3 is provided to illustrate the detection of a three-digit code and also a two or more digit code where the two digits may be the same. In a three-digit code, for example, if all three digits may be the same, one thousand different codes are possible whereas if they cannot be the same only seven hundred and twenty codes are possible. When the digits to be counted are the same, the register is referred to as being sequentially operated.

Referring now to Fig. 3, which is a circuit diagram of the digit register 172, four terminals 200 through 203 are provided. The terminal 200 is connected to the second "A" cathode of the stepping tube 44 shown in Fig. 2 and the terminal 201 is connected to the third "A" terminal thereof. Terminal 202 is connected to the cathode of triode B of tube 63 in Fig. 2 and terminal 203 is connected to the junction between resistors 55 and 54. The digit register 172 replaces the digit register 72 in Fig. 2.

The digit register 172 when connected as described above will provide an output indication at lamp 180 as is hereinafter described when the number 223 is dialed. Terminal 200 is connected to the starting anodes of tubes 175 and 194 through the resistors 173 and 190, respectively, and to ground through the registors 173 and 190 and capacitors 177 and 191, respectively. The main anodes of tubes 175 and 194 are connected to terminal 202 which is also connected to the main anode of tube 176. The cathodes of tubes 175, 194 and 176 are connected respectively through resistors 197, 179 and lamp 180 to the −50 volt source 183. The cathode of tube 175 is also connected to the starting anode of tube 194 through a varistor 193. The cathode of tube 194 is in turn connected to the starting anode of tube 176 through a varistor 184.

When the dial pulses corresponding to the first digit 2 have been received a positive potential of 40 volts is impressed upon the starting anode of tube 175 through the delay circuit of resistor 173 and capacitor 177. The positive potential through the delay circuit of resistor 190 and capacitor 191 is shunted to ground through the varistor 193 and capacitor 195. When the tube 175 is ionized however in this manner the potential at its cathode increases to +50 volts causing the varistor 193 to act as a high impedance element. A further application of +40 volts will now be effective to ionize tube 194 and in turn unlock tube 176 by causing varistor 184 to act as a high impedance element. In this manner the digit register provides an output at lamp 180 when the number 223 is dialed.

It is to be understood that the present invention is not restricted to the specific modifications disclosed herein. For example, a digit register may be provided having a two-digit output where the digits may be the same. To achieve this result Fig. 3 could be modified to provide an indicator in the cathode circuit of tube 194. Moreover the system may provide for any number of digits in the operating code. The specific embodiments disclosed herein are therefore but illustrative of the principles of the present invention. Numerous other arrangements may be devised by those skilled in the art without departing from the spirit and scope of the invention.

What is claimed is:

1. In a signaling system, an impulse generator operable to transmit a series of groups of electrical impulses representing elements of a code; a gaseous conduction device having a plurality of electrodes and a common electrode, each of said plurality of electrodes and said common electrode defining a distinct conductive path, said device being responsive to series of groups of electrical impulses to advance said conductive path therein step-by-step between said common electrode and successive ones of said plurality of electrodes; means for normalizing said gaseous conduction device, said normalizing means including a start electrode within said gaseous conduction device; a timing circuit responsive to a signal of predetermined duration from said generator for readying said gaseous conduction device by inhibiting the operation of said normalizing means; and a digit register connected to and controlled by said timing circuit including means for discriminating betwen interpulse intervals and intervals between groups of pulses, said digit register being connected to selected ones of said plurality of electrodes and operable if said conductive path in said gaseous conductive device includes said selected ones of said plurality of electrodes.

2. In a signaling system in accordance with claim 1 wherein said digit register includes a lock-out circuit connected to the unselected ones of said conduction positions of said gaseous tube.

3. In a signaling system in accordance with claim 1 wherein said digit register includes in addition a plurality of gaseous tubes connected to a selected one of said plurality of electrodes and arranged to be sequentially operated.

4. In a signaling system, an impulse generator and carrier frequency source operable to transmit a modulated wave wherein the series of groups of electrical impulses representing the elements of a code from said impulse generator modulate the wave from said carrier frequency source, a carrier frequency filter, amplifying means, means for producing a constant magnitude pulse over a constant interval responsive to the amplified variable carrier frequency from said amplifying means, detecting means connected to said constant magnitude producing means, a capacitive circuit connected to and operating with said detecting means to provide a control signal when the carrier frequency is absent, a cold cathode stepping tube having a common electrode and a plurality of electrodes connected to said capacitive circuit, said stepping tube being responsive to said capacitive circuit upon said control signal being provided to advance the conductive path therein along successive ones of said plurality of electrodes, a timing circuit responsive to said carrier frequency source, and a digit register connected to said timing circuit and to preselected ones of said plurality of electrodes, said digit register being enabled by said timing circuit and responsive to said stepping tube if said conductive path includes preselected ones of said plurality of electrodes.

5. In a telephone calling system generating means for supplying a carrier signal and modulating means for providing a sequence of groups of pulses in accordance with a code, a cold cathode gaseous tube for counting the pulses in a group of pulses from said modulating means having a plurality of electrodes and a common electrode, said plurality of electrodes and said common electrode defining distinct conductive positions, a digit register connected to selected ones of said conductive positions of said gaseous tube, said register being responsive to said selected ones of said conductive positions upon conduction therethrough, timing means including a plurality of capacitors connected to said gaseous tube and to said digit register, said timing means being responsive to said group of pulses to advance the conductive path in said gaseous tube along successive ones of said conductive positions and effective to control the operation of said digit register.

6. In a telephone calling system in accordance with claim 5 wherein said digit register is also connected to the unselected of said conductive positions of said gaseous tube and comprises a lock-out circuit responsive to said gaseous tube upon the selection of an unselected one of said conductive positions to disable said digit register.

7. In a telephone calling system in accordance with claim 5 wherein said digit register includes a plurality of gaseous tubes connected to a selected one of said conductive positions and arranged to be sequentially operated for counting the groups of pulses.

8. In a telephone calling system, generating means for supplying a carrier signal and modulating means for providing groups of pulses in accordance with a code, a cold cathode gaseous tube for counting the pulses in a group of pulses from said modulating means and having a plurality of electrodes; a reset electrode; and a common electrode, each of said plurality of electrodes and said common electrode defining an equal number plurality of conductive positions, a digit register connected to selected ones of said conductive positions of said gaseous tube, means including a first capacitor circuit responsive to an incoming pulse from said modulating means to transfer the conductive path within said gaseous tube along successive ones of said conductive positions, and timing circuit means connected to said digit register, said reset electrode and said transfer means and including a second capacitor circuit for controlling the resetting of said gaseous tube and the operation of said digit register, said digit register being responsive to said gaseous tube upon the advancement of said conductive path to selected ones of said conductive positions and including delay circuits for permitting the operation of said register only during the interval between said groups of pulses from said modulating means.

9. In a telephone calling system comprising a calling station and a plurality of selectable stations, generating means for supplying a carrier signal, means for pulse modulating said carrier signal with a sequence of groups of pulses in accordance with a code, a cold cathode gaseous tube for counting the pulses in a group of pulses from said modulating means, said gaseous tube having a common electrode and a plurality of electrodes and responsive to each pulse in a group of pulses from said modulating means to advance the conductive path therein step-by-step between successive ones of said plurality of electrodes and said common electrode, a digit register connected to selected ones of said plurality of electrodes of said gaseous tube and operable if said conductive path in said gaseous tube includes said selected ones of said plurality of electrodes, and timing means including resistive components and two capacitors connected to said gaseous tube and said digit register and responsive to each initial pulse in said groups of pulses for controlling the operation of said gaseous tube and said digit register.

10. In a telephone calling system comprising a calling station and a plurality of selectable stations, generating means for supplying a carrier signal and modulating means for providing a sequence of groups of pulses in accordance with a code for selecting one of said selectable stations, a cold cathode gaseous tube for counting the pulses in a group of pulses from said modulating means, said gaseous tube having a plurality of electrodes and a common electrode, each of said electrodes and said common electrode defining an equal number plurality of distinct conductive positions, a digit register connected to selected ones of said conductive positions and responsive to said gaseous tube if the conductive path through said gaseous tube occurs at said selected ones of said conductive positions, and a timing circuit responsive to said generating means and said modulating means and comprising resistive elements and a first and a second capacitor connected to said gaseous tube and said digit register, said first capacitor discriminating between the frequency of the carrier signal and the pulse frequency and effective to transfer said conductive path along successive conduction positions, said second capacitor discriminating between the presence and absence of said carrier signals and effective to control said digit register.

11. In a signalling system, an impulse generator operable to transmit a series of groups of electrical impulses representing elements of a code, a gaseous conduction device having a plurality of electrodes and a common electrode, each of said plurality of electrodes and said common electrode defining one of a plurality of distinct conductive positions, timing circuit means connected to said gaseous conduction device and responsive to said series of groups of electrical impulses from said impulse generator to advance the conductive path in said gaseous conduction device step-by-step along succesive conductive positions, and a digit register connected to said timing circuit means and to selected ones of said conductive positions, said digit register being enabled by said timing circuit means and responsive to said gaseous conduction device if the conductive path therethrough includes said selected conductive positions, said digit register including inhibiting means to prevent the operation of said digit register during interpulse intervals.

12. In a telephone calling system, generating means for supplying a carrier signal and modulating means for providing a sequence of groups of pulses in accordance with the code, a cold cathode gaseous tube for counting the pulses in a group of pulses from said modulating means and including a plurality of electrodes and a common electrode defining an equal number plurality of conductive positions through said gaseous tube, said gaseous tube including normalizing means, a digit register connected to selected ones of said plurality of conductive positions and operative upon conduction therethrough, transfer means connected to said gaseous tube and responsive to an incoming signal from said modulating means for displacing the conductive path along successive conductive positions, and circuit means including a capacitor timing device connected to said transfer means for controlling the operation of said digit register, said circuit means being connected to said normalizing means and responsive to said digit register to operate said normalizing means.

13. In a telephone calling system, generating means for supplying a carrier signal and modulating means for providing a sequence of groups of pulses in accordance with a code, a cold cathode gaseous tube for counting the pulses in a group of pulses from said modulating means having a plurality of electrodes and a common electrode defining an equal number plurality of conductive positions for said gaseous tube, a digit register connected to selected ones of said plurality of conductive positions of said gaseous tube, a source of potential connected to said gaseous tube for supplying a potential thereto in response to an incoming pulse from said modulating means and effective to transfer the conductive path of said gaseous tube along successive conductive positions, and a capacitor timing circuit connected to said source of potential for controlling the operation of said digit register and including means for resetting said gaseous tube, said means including a start electrode arranged within said gaseous tube, said digit register including delay means for permitting the operation of said register only during an interval between groups of pulses from said modulating means.

14. In a signaling system, an impulse generator operable to transmit a series of groups of electrical impulses representing elements of a code, a gaseous conduction device having a plurality of electrodes and a common electrode, each of said plurality of electrodes and said common electrode defining an equal number plurality of conductive positions, said gaseous device being responsive to the series of groups of electrical impulses from said impulse generator to advance the conductive path therein step-by-step along successive ones of said conductive positions, means for supplying a normalizing potential to said gaseous device, said means including a start electrode arranged within said gaseous device, a capacitor timing circuit responsive to a signal of predetermined duration from said generator for readying said gaseous device by removing said normalizing potential, digit register means connected to selected ones of said conductive positions and to said capacitor timing circuit and operable to discriminate between interpulse intervals and interpulse groups, means controlled by said timing circuit to restore said gaseous device and said registering means to normal and to provide operating potential to said registering means when said selected conductive positions are to be counted, and signaling means responsive to said registering means upon said registering means having responded to a number of electrical indications equal to the number of elements of the code.

15. In a signaling system, an impulse generator operable to transmit a series of groups of electrical impulses representing elements of a code; a gaseous conduction device having a plurality of electrodes and a common electrode, each of said plurality of electrodes and said common electrode defining an equal number plurality of distinct conduction positions, said device being responsive to the series of groups of electrical impulses from said impulse generator to advance the conductive path therein step by step from position to position; a first capacitor timing circuit connected to said gaseous device and responsive to a signal of predetermined duration for partially readying said gaseous conduction device connected to said first timing circuit; and a second capacitor timing circuit responsive to a signal of predetermined duration after the partial readying operation by said first capacitor timing circuit; a third capacitor timing circuit connected to selected ones of said conduction positions of said gaseous conduction device and operative upon conduction through said selected conduction positions; means connected to said second and third timing circuits for indicating the number of groups of electrical impulses, said means being readied by said second capacitor timing circuit and controlled by said third capacitor timing circuit.

References Cited in the file of this patent

UNITED STATES PATENTS

| | | |
|---|---|---|
| 2,373,134 | Massonneau | Apr. 10, 1945 |
| 2,487,781 | Bascom et al. | Nov. 15, 1949 |
| 2,589,130 | Potter | Mar. 11, 1952 |
| 2,619,528 | Vroom | Nov. 25, 1952 |
| 2,648,831 | Vroom | Aug. 11, 1953 |
| 2,651,740 | Lair | Sept. 8, 1953 |
| 2,696,572 | Schmid | Dec. 7, 1954 |
| 2,719,250 | Six | Sept. 27, 1955 |